United States Patent
Pullen

(10) Patent No.: US 9,160,252 B1
(45) Date of Patent: Oct. 13, 2015

(54) FOR COOLING AN AVIONICS DEVICE WITH A FAN UTILIZING A SINGLE PHASE AC MOTOR

(71) Applicant: Timothy M. Pullen, Cedar Rapids, IA (US)

(72) Inventor: Timothy M. Pullen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 333 days.

(21) Appl. No.: 13/888,876

(22) Filed: May 7, 2013

(51) Int. Cl.
| | |
|---|---|
| F04D 15/00 | (2006.01) |
| H02J 3/00 | (2006.01) |
| H02M 7/5387 | (2007.01) |
| H02P 27/06 | (2006.01) |
| H02P 27/05 | (2006.01) |
| G09F 19/02 | (2006.01) |

(52) U.S. Cl.
CPC ........... *H02M 7/53871* (2013.01); *H02P 27/06* (2013.01); *G09F 19/02* (2013.01); *H02P 27/05* (2013.01)

(58) Field of Classification Search
USPC ........................................ 318/3, 39
See application file for complete search history.

(56) References Cited

U.S. PATENT DOCUMENTS

| | | | | |
|---|---|---|---|---|
| 5,359,274 | A * | 10/1994 | Bandel | 323/207 |
| 6,021,052 | A * | 2/2000 | Unger et al. | 363/26 |
| 6,272,025 | B1 * | 8/2001 | Riggio et al. | 363/24 |
| 8,183,456 | B1 * | 5/2012 | Schroeder et al. | 136/200 |
| 2006/0103334 | A1 * | 5/2006 | Abali et al. | 318/67 |
| 2009/0244935 | A1 * | 10/2009 | Hsieh et al. | 363/34 |
| 2010/0231173 | A1 * | 9/2010 | Andrea et al. | 320/137 |
| 2011/0205766 | A1 * | 8/2011 | Rodriguez | 363/37 |
| 2012/0155140 | A1 * | 6/2012 | Chen et al. | 363/132 |
| 2013/0336016 | A1 * | 12/2013 | Shiji | 363/21.02 |
| 2014/0077778 | A1 * | 3/2014 | Sato et al. | 323/282 |

\* cited by examiner

*Primary Examiner* — Bentsu Ro
*Assistant Examiner* — Zemenay Truneh
(74) *Attorney, Agent, or Firm* — Angel N. Gerdzhikov; Donna P. Suchy; Daniel M. Barbieri

(57) ABSTRACT

A system is disclosed which utilizes a non-pulse width modulated signal, which provides a fully rectified sinusoidal modulated DC link to a single phase AC motor to emulate a variable single phase AC power line. The system provides for reduced EMI and reduced size when compared to a controller with a PWM drive signal.

16 Claims, 5 Drawing Sheets

FOR COOLING AN AVIONICS DEVICE WITH A FAN UTILIZING A SINGLE PHASE AC MOTOR

FIELD OF THE INVENTION

The present invention generally relates to electronic equipment, and more particularly relates to cooling fans, and, even more particularly, relates to controllers for driving cooling fans in avionics equipment.

BACKGROUND OF THE INVENTION

In the past, cooling fans have been used in a wide variety of environments, including with avionics equipment on an aircraft. In some aircraft, it is desirable to have cooling fans which are controllable over a wide range of conditions. In some avionics boxes, in the past, these fans were often turned by brushless DC motors, which were controlled by specialized controllers, such as trapezoidal drivers. It has also been well known to use AC motors for many purposes. Often, these motor controllers are speed controlled with a Pulse Width Modulated (PWM) motor drive voltage.

While these cooling systems may have many advantages in particular uses, they also have created challenges. One common challenge created by these designs is the relatively high cost. Additionally, these PWM controllers are relatively complex and require circuitry which is too large for the form factors of some avionics applications. Furthermore, PWM controllers of the drive voltage of AC motors often produce a relatively high level of electromagnetic interference (EMI), which may then require costly, bulky and heavy shielding in some applications.

Consequently, there exists a need for improved methods and apparatuses for cooling avionics equipment.

SUMMARY OF THE INVENTION

It is an object of the present invention to provide a low cost controller for an AC load.

It is another object of the present invention to provide a compact AC load controller.

It is yet another object of the present invention to provide an AC load controller that produces a lower amount of EMI.

It is a feature of the present invention to utilize a fixed frequency controlled boost convertor to provide a rectified sinusoidal modulation of a DC link to a power bridge.

It is a feature of the present invention to provide input to a power bridge that is free of any pulse width modulation.

The present invention is an apparatus and method for controlling an AC motor, which is designed to satisfy the aforementioned needs, provide the previously stated objects, include the above-listed features, and achieve the already articulated advantages. The present invention is carried out in a "wasted space-less" and "reduced EMI" manner, in a sense that the size of a fully functional AC load controller and the EMI produced has been reduced.

Accordingly, the present invention is a system for controlling an AC load comprising: A source of input power; A sine reference; A power bridge, or multiple bridges; A boost convertor, with a DC offset, the boost convertor configured to receive said input power and said sine reference and provide, in response thereto and without using a pulse width modulated drive signal, a rectified sinusoidal modulated DC link drive signal to said power bridge; and an AC load which sees a single phase sinusoidal voltage from said power bridge.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Figure 1:
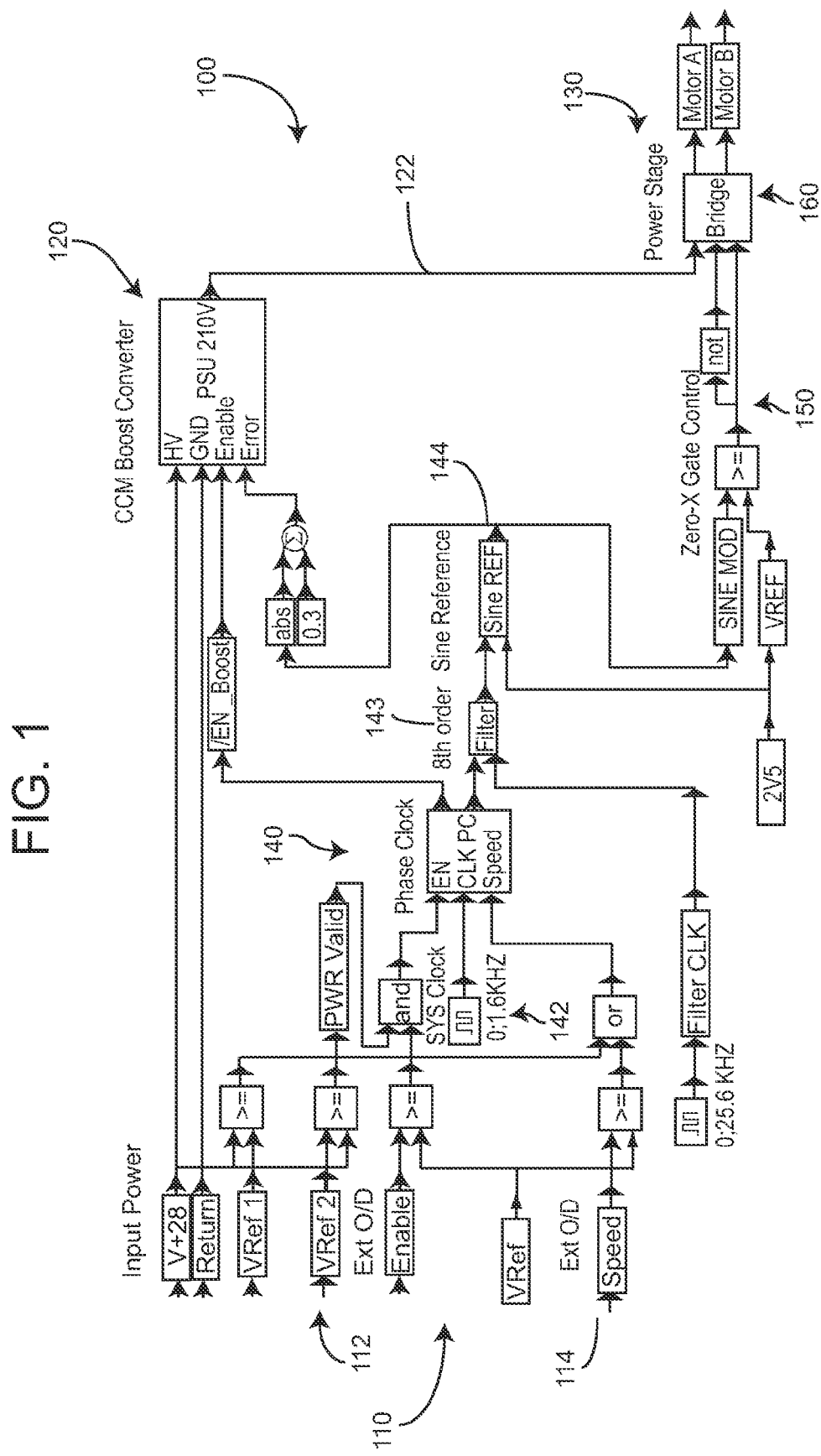
FIG. 1 is top level architectural summary of the circuit of the present invention.
Figure 2:
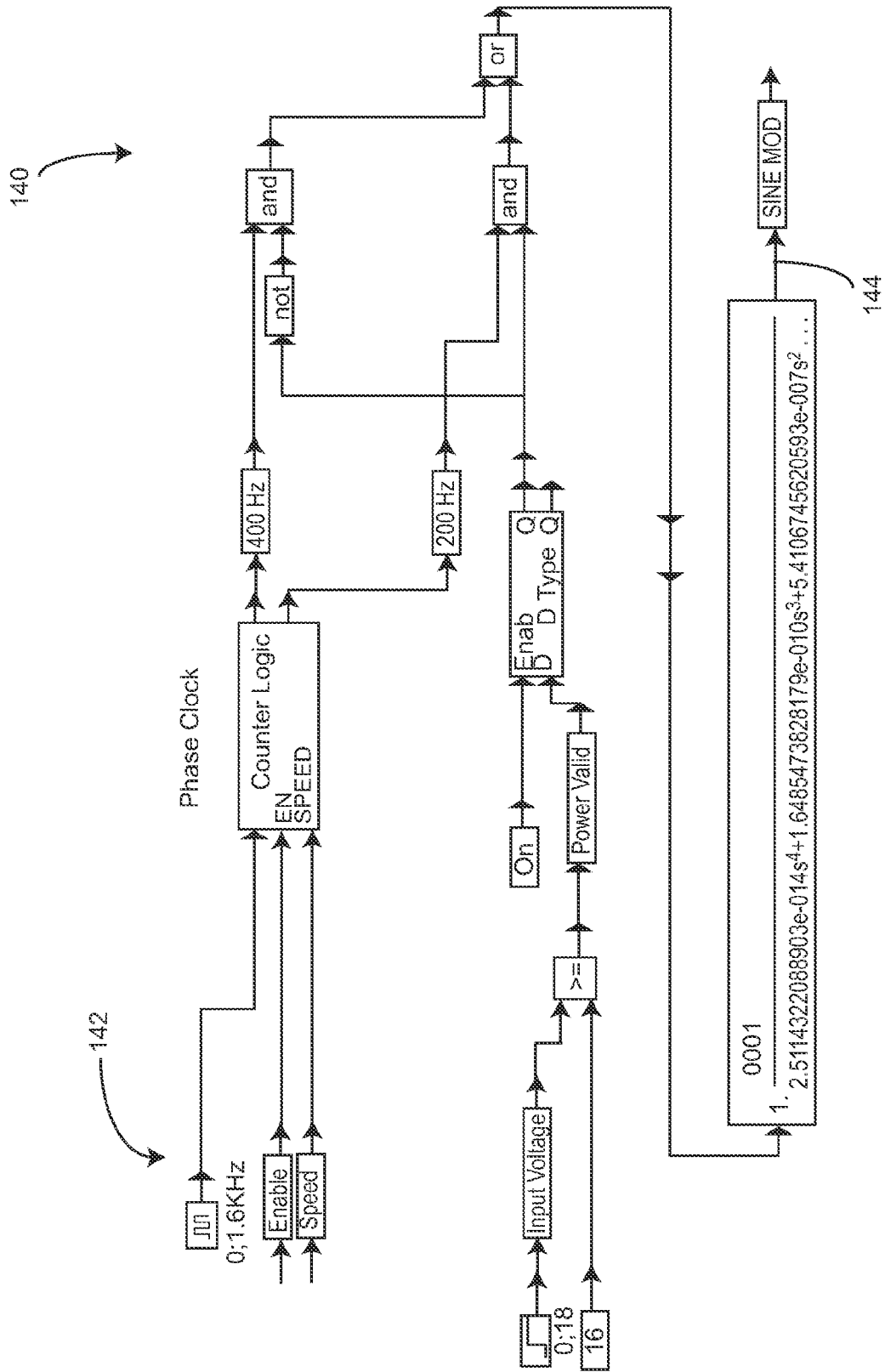
FIG. 2 is more detailed view of a Sine Voltage reference of FIG. 1.
Figure 3:
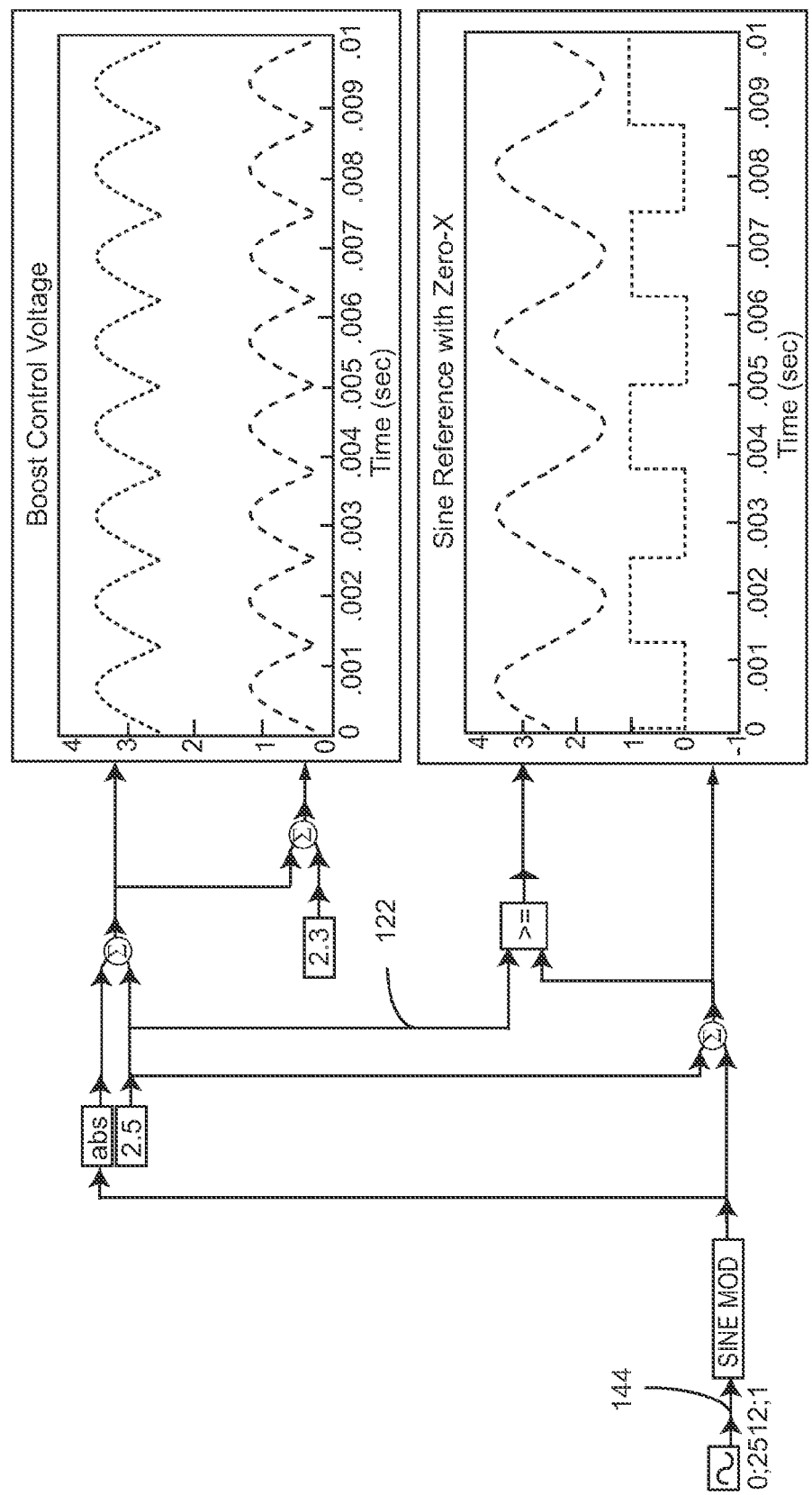
FIG. 3 is detailed view of the circuitry and the waveforms present in the circuit of FIG. 1.

In prior art techniques, in almost all cases, single-phase AC machines are either directly connected to a sinusoidal AC voltage supply, such as 115 VAC, or they are connected to an asymmetrically switched power bridge using MOSFET devices. In the case of the latter, PWM techniques are employed to create a pseudo sinusoidal motor stator voltage and current, and an output filter is used between the power MOSFET drive and the AC machine to reject the carrier frequency component. This is equivalent to driving the motor with a direct AC voltage, but with the complexity in design and the additional ramifications of PWM related harmonic interaction within the motor, and PWM borne EMI. It must be said that unless substantial post switch carrier rejection filtering is employed when PWM is used, the motor is susceptible to harmonic influence, and these typically create motor stator resonance, heating and, over time, may lead to premature failure of the motor.

Now referring to the drawings, where like numerals refer to like matter throughout, the present invention relates to a novel control system and technique for single phase AC motors, or machines of the type that may have constant load-torque requirements, such as cooling fans, pumps, lamps, etc. without using pulse width PWM for machine commutation. The invention employs fixed frequency sinusoidal modulation 144 as a control reference for a boost power stage 120 DC link 122, and the motor is operated in the same way, as if it were connected to a regular single phase 115 VAC line with neutral. The boost converter 120 is operated in continuous conduction mode with sinusoidal reference 144, and this drives power efficiency and aids EMC management. For the purposes of discussion, one embodiment of the invention is described which controls single phase AC Fan motors with a nominal line voltage of 115 VAC at 400 Hz. Throughout this description, the Fan controller shall be referenced as a fixed frequency supply unit, (FFSU), or generally designated 100.

In an exemplary embodiment, it is required to provide 115 VAC 400 Hz single phase power to a cooling fan which is installed within avionics equipment. The FFSU 100 must be able to drive the fan in both low and high speed modes of operation. Input power to FFSU is derived from an external source. The external source may be an aircraft power bus of the type that has two unique output voltages, 18 Vdc and 25 Vdc, which are used by FFSU 100 as voltage inputs to the high voltage boost converter 120. At 25 Vdc, the boost output stage provides an AC voltage of 115 VAC 400 Hz using a 2.5V reference voltage error feedback term; therefore, at 18V, the output voltage is 80 VAC 200 Hz. To minimize motor loss and reduce slip, FFSU has internal logic to ensure that the motor voltage frequency is adjusted to 200 Hz in low speed mode.

The main functional blocks within FFSU are as follows: (a) power input voltage detect 110 for both DC valid 112 and speed detect 114, (b) boost converter 120 with coupled inductor 121, (c) phase clock logic 140 with fixed frequency control 142, (d) 8th order elliptical filter 143 for sinusoidal reference 144 including rectifier, (e) gate drive logic 150 and gate enable 152, (f) MOSFET full bridge with 160 complimentary zero-x control. The absolute value of the sine reference 144 is provided to the boost converter 120.

Power Input Voltage Detect

FFSU power input 110 is subject to DC validation using a comparator where the input voltage is tested against a reference term that is equivalent to +16 Vdc. Once the input voltage >16V, DC valid is asserted and FFSU enables the fan logic. A second comparator is also looking at FFSU input voltage and is responsible for asserting high or low speed. In low speed mode, the input voltage is 17V and high speed is set to 21V.

Boost Converter with Coupled Inductor

The duty ratio of a conventional boost converter increases with the increase of the voltage step-up ratio. For applications requiring high voltage step-up ratio such as FFSU 100, it becomes a challenge to maintain high efficiency with a large duty cycle ratio. Parasitic ring within practical circuits also induce additional voltage stress and necessitates the use of switches with a high blocking voltage rating, leading to more losses. The coupled inductor boost topology provides a practicable solution to these problems. The coupled inductor reduces the necessary duty cycle ratio for a given step-up voltage ratio, and at the same time, reduces the voltage across the switch. Therefore, for a given high voltage step-up ratio and with proper coupled-inductor design, the coupled-inductor boost converter is more efficient than the conventional boost converter. This approach is used within FFSU and, to reduce cost and parasitic uncertainty, the use of a planar magnetic coupled inductors 121 (planar transformer) are in place.

Phase Clock Logic 140 with Fixed Frequency Control

The sinusoidal reference voltage 144 is ultimately derived from a fixed frequency square wave 142 with 50% duty cycle at 1.6 KHz. This is divided down to both 400 and 200 Hz, and selection of frequency is dictated by the speed. The FFSU 100 has two modes of selecting both speed and enable; this is done by validation of input voltage or by discrete logic inputs.

Sinusoidal Reference Generation 144

To be able to modulate the boost error amplifier with an accurate sinusoid voltage, FFSU has used an 8th order elliptic filter 143 to attenuate all the harmonic content within the square wave clock signal in order to realize a very low power spectral density for the 2nd and 3rd harmonics of the resultant sine wave function. The 2nd harmonic is <−60 dBv down compared to the fundamental. The sine voltage reference is used for two purposes, firstly as a means of controlling the power stage per half-cycle with asymmetric half bridge switch control using zero-X. This function enables the motor to switch phase polarity each time the sine reference intersects the zero reference. This also suggests that the power devices are in conduction for a complete half cycle with losses being attributed to conduction only based upon Rds (on). With high performance MOSFET power switch technology rated at 550V, and with low Rds (on), the conduction losses are very small, given that the AC machine phase current is less than 300 mA.

Scalar Control

Being a fan control system, and given that closed loop control of speed is open loop, it is evident that the fan speed is dictated by the synchronous frequency of the stator field flux and the applied AC voltage magnitude. This is essentially open loop control and optimal control objectives are based upon maintaining the relationship between two variables (V/F), namely the applied voltage (V) and frequency (F). If these terms are adjustable, which they are in FFSU, then the objective is known as Scalar control. If the rated VF ratio (115/400=0.287) is maintained at any unique speed objective, then the slip term is likely to remain constant and the motor will not incur increased currents. If the motor equivalent load is increased, speed will drop due to lack of type-(1) speed control and the slip term will increase. This also increases motor current and creates excessive heat. The slip ratio is defined below.

$$\text{Slip \%}=[(N_s-Nb)/Ns]\times 100$$

Where: N, is full synchronous speed or stator field flux frequency and Nb is the base speed or rotor RPM.

Control of the speed term is based upon a clock signal that is either 200 Hz or 400 Hz and transition to either state is carried out during zero-cross of the sine reference. During this transitional state, the sinusoidal reference voltage amplitude is controlled by a FET switch and resistive divider. In low speed mode, the voltage is reduced to meet the VF ratio as much as is practicable.

Figure 4:
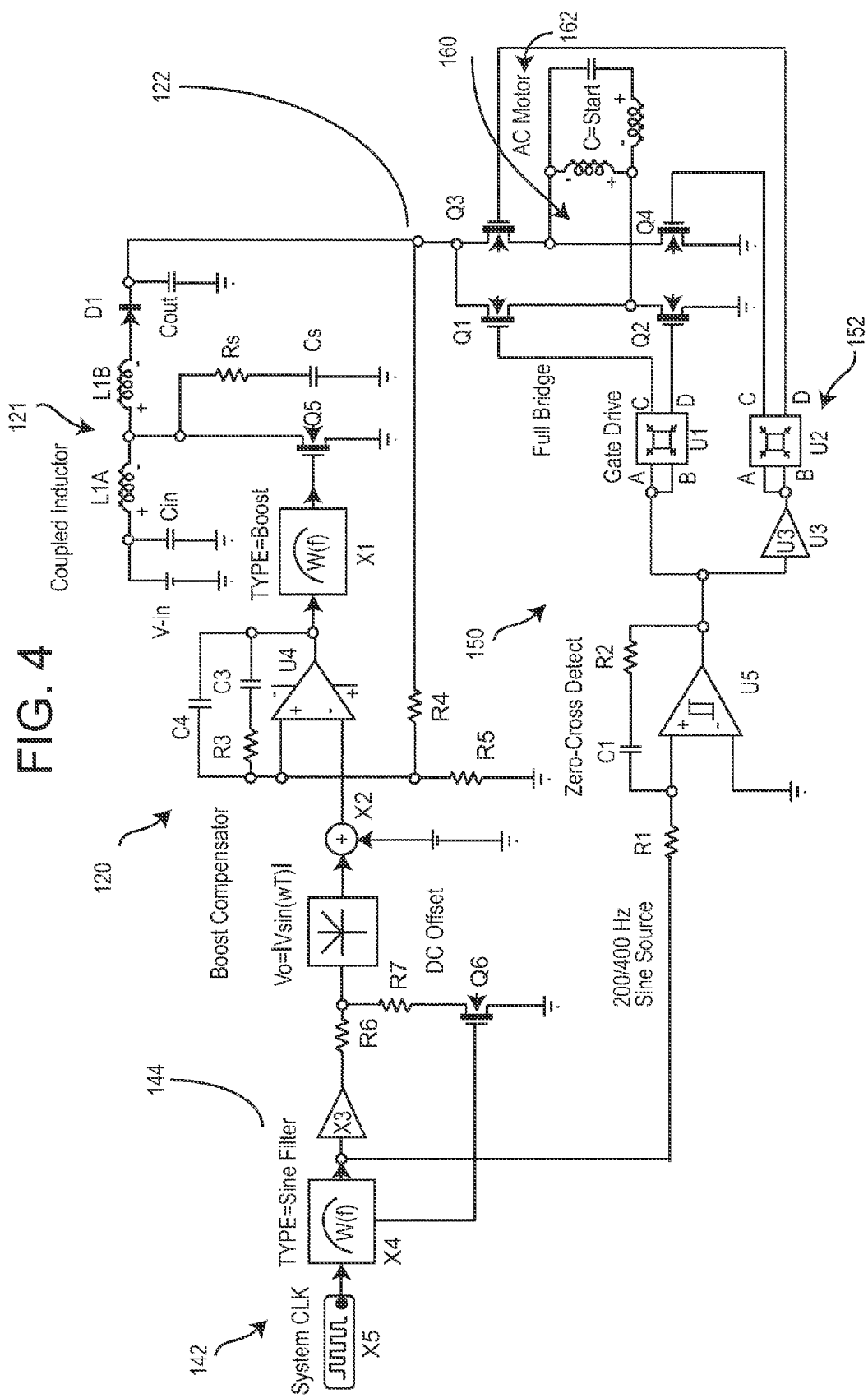
FIG. 4 is simplified equivalent electronic circuit of the top level circuit of FIG. 1.

Now referring to FIG. 4, there is shown a top level simplified circuit summary that captures the design approach will all major functions such as high voltage boost converter, full bridge dive circuit, including gate drivers, along with the key control logic functions, such as boost compensation, zero-cross detect and sinusoidal reference generation.

Figure 5:
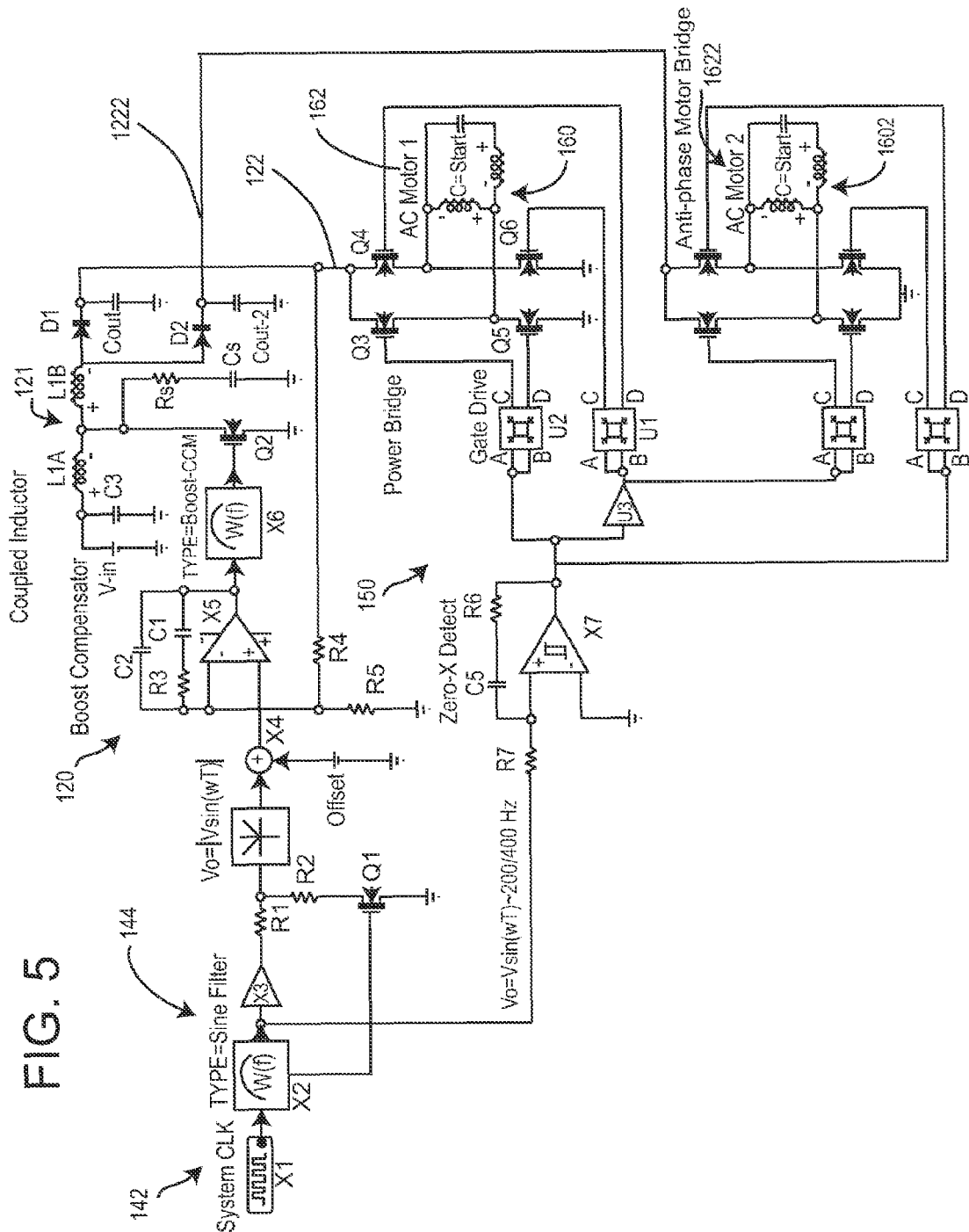
FIG. 5 is simplified equivalent electronic circuit of the top level circuit of FIG. 1. with second power stage and anti-phase control for acoustic noise cancellation

Now referring to FIG. 5, there is shown an alternate embodiment of present invention where acoustic noise reduction is achieved by this topology. The circuit of FIG. 4 represents a single channel sine modulated AC machine controller, which provides 115 VAC 400 Hz phase voltage to a single phase motor 162. FIG. 5 shows the same circuit, but with the addition of a second power bridge 1602 connected to a replicated diode-capacitor boost output (D2 and Cout-2) may also be used to power a second motor 1622 (AC Fan), but with 180 degrees phase shift bridge control.

This has the advantage of providing the same scalar controlled frequency and voltage to both motors; one being in anti-phase, therefore, both motors are able to run at the same VF constant and will see almost identical slip ratios. As a consequence, the acoustic noise effect due to vortex shedding is greatly reduced, due to destructive interference of two equivalent tones in anti-phase, where the summation of tonal amplitude is reduced. Vortex shedding occurs when the inlet manifold airflow strikes the tip of the fan blade, producing a stream of vortices downstream, which results in the production of pure tones. These are typically dominant tones, with a frequency range of 400 to 800 Hz where the tonal frequency is a factor of fan rotation per second and number of blades within the fan.

For applications where active forced air cooling is required and where acoustic noise (tonal resonance) is a nuisance, the benefits of two smaller fans running synchronous with both voltage and frequency, one in anti-phase control compared to a larger single fan, offers significant noise cancellation performance.

The acoustic noise level reduction is simple to achieve with this invention due to the topology of the sine modulated AC controller where the DC link, or Boost output voltage and frequency, are being used to drive two independent AC motors synchronously and without complex phase locked loop feedback systems.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. An avionics equipment cooling system comprising:
a single phase AC motor;
a fan blade coupled to said motor;
a source of input power from an aircraft power bus; and
a controller for controlling operation of said motor, said controller comprising:
   a boost converter which receives:
      power from said aircraft power bus; and
      an error signal comprising an absolute value of a fixed frequency sine reference;
   said boost converter outputting a modulated DC link;
      a zero-cross gate control, receiving said fixed frequency sine reference; and
   an asymmetric half-cycle power stage, receiving input from said zero cross gate control and further receiving said modulated DC link, and in response thereto, generating at a connection point across said motor, a signal which is equivalent to a single phase sinusoidal voltage.

2. The system of claim 1 wherein said avionics equipment cooling system does not employ pulse width modulated control of a plurality of switches in a power bridge.

3. The system of claim 2 wherein said boost convertor comprises a planar transformer.

4. The system of claim 2 wherein the boost convertor is operated in a continuous conduction mode.

5. The system of claim 4 wherein said motor has a constant load-torque characteristic.

6. The system of claim 5 wherein said controller comprises an eighth order filter and, at least indirectly coupled to a phase clock and a reference, which generates said fixed frequency sine reference.

7. The system of claim 6 wherein said asymmetric half-cycle power stage comprise four MOSFETs arranged to form a motor power bridge.

8. The system of claim 5 wherein said controller comprises an eighth order filter and, at least indirectly coupled to a phase clock and a reference, which generates said fixed frequency sine reference.

9. The system of claim 1 wherein controller is equivalent to a variable single phase AC power line, which comprises a fully rectified sinusoidal DC link modulator.

10. The system of claim 9 wherein said fully rectified sinusoidal DC link modulator utilizes a fixed frequency absolute value modulation as a control reference for a boost power convertor which has a DC offset.

11. A multi-fan noise reduced avionics equipment cooling system comprising:
a first motor and a second motor;
a first fan blade coupled to said first motor;
a source of input power from an aircraft power bus; and
a controller for controlling operation of said first motor and said second motor, said controller comprising:
   a boost converter which receives:
   power from said aircraft power bus; and
   an error signal comprising an absolute value of a fixed frequency sine reference;
   said boost converter outputting a first modulated DC link, and a second modulated DC link;
   a zero cross gate control, receiving said fixed frequency sine reference;
   a first asymmetric half-cycle power stage, receiving input from said zero cross gate control and further receiving said first modulated DC link, and in response thereto generating at a connection point across said first motor, a first signal which is equivalent to a first single phase sinusoidal voltage; and
   a second asymmetric half-cycle power stage, receiving input from said zero cross gate control and further receiving said second modulated DC link, and in response thereto generating at a connection point across said second motor, a second signal which is equivalent to a second single phase sinusoidal voltage.

12. The system of claim 11 wherein said second single phase sinusoidal voltage is in anti-phase with respect to said first single phase sinusoidal voltage.

13. The system of claim 12 wherein one of said first motor and said second motor has an integrated controller configured for making adjustments in fan speed to reduce audible beat frequencies.

14. The system of claim 11 wherein first motor is a single phase AC motor.

15. The system of claim 11 wherein said first motor has a constant load-torque characteristic.

16. The system of claim 15 wherein said controller comprises an eighth order filter and, at least indirectly coupled to a phase clock and a reference which generates said fixed frequency sine reference.

* * * * *